US006446578B1

(12) United States Patent
Irwin

(10) Patent No.: US 6,446,578 B1
(45) Date of Patent: Sep. 10, 2002

(54) SPRAYING METHODS AND APPARATUS

(75) Inventor: Max Edward Irwin, Pukekohe (NZ)

(73) Assignee: Maxim Products Limited, Pukekohe (NZ)

( * ) Notice: Subject to any disclaimer, the term of this patent is extended or adjusted under 35 U.S.C. 154(b) by 0 days.

(21) Appl. No.: 09/462,225

(22) PCT Filed: Sep. 24, 1998

(86) PCT No.: PCT/NZ98/00143

§ 371 (c)(1),
(2), (4) Date: Feb. 16, 2000

(87) PCT Pub. No.: WO99/15279

PCT Pub. Date: Apr. 1, 1999

(30) Foreign Application Priority Data

Sep. 24, 1997 (NZ) ............................................ 328833

(51) Int. Cl.[7] ............................................ A01K 13/00
(52) U.S. Cl. ........................................ 119/604; 239/311
(58) Field of Search ............................ 119/14.01, 604, 119/14.02, 14.03; 239/311

(56) References Cited

U.S. PATENT DOCUMENTS 4,804,144 A 2/1989 Denman

FOREIGN PATENT DOCUMENTS

| | | |
|---|---|---|
| AU | 26529/25 | 12/1925 |
| AU | 45236/85 | 7/1985 |
| EP | 0 243 104 | 10/1987 |
| EP | 0 716 043 | 6/1996 |
| GB | 1 516 568 | 7/1978 |
| GB | 2 092 682 | 8/1982 |

*Primary Examiner*—Thomas Price
(74) *Attorney, Agent, or Firm*—Brown, Martin, Haller & McClain, LLP

(57) ABSTRACT

The present invention relates to methods and apparatus, preferably adapted to spray a veterinarian preparation. The apparatus includes: (a) a mixture delivery line to deliver preparation from a source through a lance to a mixture chamber, and (b) air delivery lines to deliver air from a source through a lance to a mixing chamber, and (c) control means for controlling the rate of delivery of mixture and/or air to the mixing chamber, and (d) a nozzle, wherein the arrangement and configuration of the mixing chamber is such that the venturi effect is harnessed to effectively mix the preparation and air, carrying and/or atomising the preparation to spray same. Methods of applying a veterinarian products or preparations using the above spray device are also disclosed.

10 Claims, 3 Drawing Sheets

SPRAYING METHODS AND APPARATUS

TECHNICAL FIELD

This invention relates to improvements in or relating to spraying methods and apparatus. More particularly, it relates to spraying methods and apparatus that may be specifically adapted to permit the effective spraying of substantially viscous liquids. However, the invention is not to be limited to such use, and hence the prior art and possible applications of the invention as discussed below are given by way of example only.

BACKGROUND ART

Application of substances to a substrate by spraying is a convenient method of application in that good coverage usually ensues, that is a large surface area can quickly and easily be sprayed, with less effort expended and with less mess than with more direct means of applying substances to a substrate. Further, sprayed substances are more easily able to penetrate through substances due to the force with which the substance is ejected from the sprayer. Thus, spraying devices are many, and range in construction and potential application from aerosol cans through to hand pumped garden spray applicators through to powerful water sprayers using compressed air as a propellant.

One particular example where the application of products to a substrate by spraying is advantageous and desirable is in the dairy industry, particularly with regards to applying antiseptic or medical products to cows teats and udders. One particular bacterial infection for which the application of antibacterial substances is desirable is mastitis, which is a bacterial infection of the mammary glands of the cow. In addition to being a painful and unsightly infection, a main problem is that milk from mastitis infected cows is not permitted to be supplied to most dairy companies for distribution to and consumption by the general public. Hence, having one or more cows infected with mastitis during milking season can potentially prove very costly to the farmer. Whilst mastitis can be cured, clearly it is far more advantageous to prevent any occurrence of mastitis in the first place.

Whilst traditionally environmental and contagious forms of mastitis have been problematic for farmers, in present times environment mastitis is the more prevalent mode of infection. Environmental mastitis is primarily caused by infection of the mammary gland with streptococcus bacteria. Direct application of antibacterial solutions such as iodine preparations by spraying on the solutions or dipping the teats directly into the solutions have been used.

In most milking situations direct application of the treatments eg by dipping teats is difficult and time consuming. Cows may, for example, kick the container of preparation from the farmer's hands, or otherwise disrupt or delay the application process. Spraying on of treatment preparations is accordingly considered a more desirable treatment of applying these treatments.

To date the only commonly used sprayable treatments have been the lessor favoured iodine-based preparations. These preparations have been atomised and applied through product pressurised equipment. Product pressurised spraying equipment is generically available and will be familiar to the workers skilled in the art. However, it will be appreciated that purchasing and installing a product pressurised spraying system involves a significant purchase and set up cost and, further, has difficulties in operation. This is because product pressurised spraying equipment requires the product to completely fill the delivery lines. Depending on the distance of the pump to the spray head this means a significant volume of the preparation will be present throughout the delivery system and consequently large volumes of preparation are required to operate the delivery system. This results in ongoing costs in purchasing significant volumes of treatment preparation but furthermore causes significant ongoing running costs due to the necessity of replacement of exposed parts of the equipment. Such preparations are often reactive and/or corrosive and all exposed components of the equipment eventually need to be replaced. Furthermore, because of the large volume of treatment preparation contacting the exposed parts of the equipment, it is difficult and time consuming to effectively flush and clean the equipment. Furthermore, because of the significant volume of preparation required to operate the delivery system, flushing and cleaning also results in a significant wastage of unused preparation remaining in the equipment.

Particularly effective mastitis treatments have been developed by Alcide Corporation (USA) and are sold under the trade mark UDDERGOLD™. UDDERGOLD™ treatments are a teat sanitiser that has proven to be especially effective against environmental pathogens, and are often considered to be the treatment of choice for the control of both environmental and contagious mastitis. UDDERGOLD™ treatment is provided in a two-pot mixture which when mixed has a limited shelf life of less than 24 hours. Furthermore, the mixed UDDERGOLD™ treatment is quite viscous, unlike iodine solutions that are essentially the same density of water and are easily atomised.

To date, UDDERGOLD™ treatments have not been able to be spray applied in an effective manner. Presently, the treatment mixture is made up and then directly applied by teat dipping. The reason it has been unable to be applied by commonly used product pressurised equipment is primarily due to its viscosity. The spray heads of such equipment have simply been unable to atomise the mixture. However, there are additional problems with attempting to apply UDDERGOLD™ treatment with product pressurised spraying equipment. As noted above, the UDDERGOLD™ treatment has a limited shelf life, which means that shortly after use the equipment must very shortly thereafter be flushed and cleaned with consequent wastage of preparation present in the equipment. The preparation is costly and the flushing of unused preparation represents loss of income for the farmers. Furthermore, the flushing and cleaning is rendered difficult as the UDDERGOLD™ treatment, due to its viscosity when mixed, is a tenacious and difficult product to clean off surfaces it contacts. It is also corrosive and/or reactive to the surfaces it contacts. Accordingly, cleaning of product pressurised spraying equipment is an additional problem to the basic inability of such equipment to adequately spray the mixture. Farmers have accordingly reverted to directly applying UDDERGOLD™ by teat dipping.

It would be desirable to provide spraying methods and apparatus that would minimise the contact of such viscous and corrosive/reactive mixtures with componentry of same. It would further be desirable to enable the effective spraying of viscous mixtures such as the UDDERGOLD™ treatments. It would further be desirable to provide a spraying device that would be of comparatively low cost, minimise product loss due to run off, relatively easy to clean and also requires relatively small volumes of preparation in operation thereby minimising wastage and optimal utilisation of preparations with short shelf lives and high cost. It would further be desirable to provide a spraying device that would enable antiseptic preparations to penetrate into cow's teats and exert an antiseptic effect there.

It is an object of the present invention to address the foregoing problems or difficulties or at least to provide the public with a useful choice.

Further aspects and advantages of the present invention will become apparent from the ensuing description that is given by way of example only.

DISCLOSURE OF INVENTION

According to one aspect of the present invention there is provided an air spray device for spraying a veterinarian mixture, said device including (a) a mixture delivery line to deliver mixture from a source to a mixing chamber, and (b) the air delivery lines to deliver air from a source to the mixing chamber, and (c) control means for controlling the rate of delivery of mixture and/or to the mixing chamber, and (d) a nozzle, wherein the arrangement and configuration of the mixing chamber is such that the venturi effect is harnessed to mix the preparation and air, and/or atomise the mixture prior to spraying same out through the nozzle.

The air spray device of the present invention may be purpose built or may preferably be made by adapting generically available engine guns. The overall structure and operation of same is known, and it is not proposed to further describe same.

In a preferred embodiment, the arrangement and configuration of the mixing chamber may be such that the point at where the air is delivered to the mixing chamber is closer to the nozzle than the point at which the mixture is delivered to the mixing chamber such that when air enters the mixing chamber ahead of the mixture, the mixture is impelled by venturi effect to leave the delivery lines and enter the mixing chamber, being atomised and/or carried as droplets upon contact with the air, and enabling its exit from same as spray.

According to another aspect of the present invention there is provided an improved spraying device comprising (a) mixture delivery lines to deliver mixture from a source through a lance to a mixing chamber, (b) air delivery lines to deliver air from a source through a lance to a mixing chamber, (c) control means for controlling the rate of delivery of mixture and air to the mixing chamber, (d) a nozzle, wherein the arrangement and configuration of the device and/or nozzle is such that the mixture is carried and/or delivered in an atomised spray therefrom.

In a preferred embodiment the mixture to be sprayed using the spray device may be a veterinarian preparation. Such preparations may be adapted to provide an antiseptic effect when applied to the mammary glands or teats of a cow.

In a preferred embodiment where the mixture to be sprayed may be a veterinarian preparation which is a relatively viscous fluid. Such fluids may have a viscosity of between 50–250 centre strokes on the ISO VG scale.

In a further preferred embodiment the present invention is adapted to spray a mixture with a viscosity between 100–150 centre strokes on the ISO VG scale. In a further preferred embodiment the preparation to be sprayed may be product marketed in the United States as UDDERGOLD™ and manufactured by Alcide Corporation.

Preferably the arrangement and configuration of the nozzle is such that it is substantially increased from the aperture size conventionally used in such air spray devices. The widening of the aperture, may be to any extent considered suitable yet remaining effective for the purposes of the present invention. Preferably the aperture of the nozzle may be narrower in the mid point of the nozzle than at the entry point and exit point of the aperture thereby accelerating the passage of mixture and air entering the nozzle. The aperture of the nozzle may thus have a wide entry point tapering to the midpoint for acceleration purposes, and then tapering out again providing a wide exit point enabling a correspondingly wide angle of penetrating spray.

The width of the apertures throughout the nozzle may vary eg between substantially 3–5 mm, depending on the viscosity of the liquid desired to be sprayed ie wider for more viscous liquids and vice versa The pressure of air supplied to the air delivery line should be great enough so that when mixture is sprayed from the nozzle onto a cow's teat the mixture is delivered at sufficient pressure to completely coat and seal the cow's teat, as well as to penetrate into the teat through the teat canal, and seal same. This is an unexpected result of using such air spray equipment that has significant advantages in that sealing the teat canal provides a very effective barrier against infection.

Preferably, but not exclusively, the source of air supplied to air delivery lines may consist of a 4–14 cubic foot air compressor that delivers air at approximately 20–100 psi. Using such compressor allows the air spray device to work effectively and allows the invention to be implemented using relatively inexpensive components.

According to another aspect of the present invention there may be provided an air spray device substantially as described above, wherein the arrangement and configuration of the nozzle is such that the nozzle is supported at substantially 60–90° to the axis of the lance.

According to a further aspect of the present invention there is provided an air spray device which includes:

(a) mixture delivery lines to deliver mixture from a source through a lance to a mixing chamber, (b) air delivery lines to deliver air from a source through a lance to a mixing chamber, (c) control means for controlling the rate of delivery of mixture and air to the mixing chamber, (d) a nozzle, wherein the length of the lance is substantially longer than that conventionally used in off the shelf engine guns.

The lance may be lengthened to any extent considered suitable and yet remaining effective for the purposes of the present invention, but may preferably be substantially between 20 to 40 centimetres. In a further preferred embodiment the length of the lance may be extended to substantially 35 centimetres.

According to a further aspect of the present invention there is provided an air spray device substantially as described above wherein the source of the mixture may be a container which enables accurate measuring and preparation of the mixture. Preferably this may be a graduated plastic preparation bottle having clearly marked level markings. The plastic bottle may preferably house a chemical resistant plastic suction pipe, into which mixture may enter through a non return valve, be fed through a screw-on cap of the plastic bottle and then into the mixture delivery lines of the air spray device.

However, in one embodiment mixture may be supplied to a mixture delivery line under pressure. In such an embodiment mixture may be supplied to the air spray device along a pressurised supply line from a large remote reservoir. In some instances a large volume of mixture may need to be dispensed in a short period of time, and this would normally empty a container of mixture attached to the air spray device.

The use of a remote reservoir also allows for automation of the mixing process that forms the mixture to be sprayed. In one embodiment automated mixing may be accomplished with use of automated metering pumps that respond to a sensed pressure in the supply line.

Preferably the mixture delivery lines may be thickened stainless steel tubes. The overall diameter of the stainless steel tubes delivering mixture to the mixing chamber may be substantially 12 millimetres, having walls 1.5 millimetres thick.

The dimensions of the stainless tube delivery air to the mixing chamber may be substantially 6 millimetres overall diameter, with substantially 1–1.5 millimetre thick walls.

In a preferred embodiment any element or elements of the invention such nozzle, lance or handle may be constructed from materials which resist the corrosive effects of mixtures to be sprayed by same. In such an embodiment any or all of these elements may be constructed from either aluminium, stainless steel or a plastic formed from copolymer polypropylene. However, it should be appreciated by those skilled in the art that other materials may be used to construct the above components and reference to the above only throughout this specification should in no way be seen as limiting.

In a preferred embodiment a layer of corrosion resistant material may also be applied to an element or elements of the air spray device. For example, in some embodiments components may be covered with a teflon coating, or may be coated with a corrosion resistant metal through anodising, or may be plated with nickel through electrolysis.

In a preferred embodiment the air spray device may include a single activating control that controls the opening positions of two valving elements, thereby controlling the amounts of both mixture and air delivered to the mixing chamber. This configuration of the invention substantially simplifies the controls to be actuated by the user while giving control of the performance of the invention.

In such an embodiment a sliding valve arrangement may be used This configuration allows a single movement of a trigger to move both valve heads and allow air and the mixture to be supplied to the nozzle. The applicants believe that this configuration of the invention should be used when the mixture to be sprayed is supplied under pressure to the air spray device. However, in alternative embodiments the activating control of the air spray device may not control the amounts of both air and mixture delivered to the mixing chamber. In one alternative embodiment an activating control may control the amount of air only delivered to the mixing chamber. In such an embodiment it is envisioned that the supply of mixture to the air spray device may be via a bottle or container attached to same.

According to a further aspect of the present invention there is provided an air spray device substantially as described above wherein it has been ergonomically enhanced including changing the angle of the nozzle as is noted above, together with enlarging a handle of the spray device which permits the same to be hung from a hook mechanism when not in use.

In one embodiment the head of the spray device may be formed into a handle that includes an aperture, allowing the invention to be hung from a hook when not in use.

According to a further aspect of the present invention there is provided a method of spraying a mixture from an air spray device comprising the steps of:

(a) attaching sources of mixture and air to delivery lines,
(b) operating control means for said delivery lines to deliver mixture and air to a mixing chamber,
(c) spraying the resulting atomised mixture through a nozzle onto a desired substrate.

According to yet another aspect of the present invention there is provided a method of altering an off-the-shelf generic air spray device comprising any one or more of the following steps:

1 altering the arrangement and configuration of the mixing chamber so that a viscous mixture may be effectively atomised,
2 enlarging the aperture of the nozzle,
3 placing the nozzle at substantially 60–90° to the axis of the lance,
4 extending the length of the lance.

In a preferred embodiment the length of the lance may be extended to a length of approximately 20 to 40 centimetres, preferably being approximately 35 centimetres.

Those skilled in the art will appreciate that the present invention is more than a simple adaptation of an existing type of air spraying device. To work effectively to spray relatively viscous veterinarian products, a number of major adaptations are required to existing air spraying devices.

The mixing chamber used must be firstly modified to allow the viscous preparation to be atomised effectively, while the length and orientation of a lance used in the device must also be modified to ensure that a device may be easily and effectively used in a cow shed. Adaptations are also required for an aperture or apertures in the spray devices nozzle to ensure that the substantially viscous preparation to be sprayed exits the spray device in an atomised form.

Such a spray device may preferably be driven by an adequate source of pressurised air that can supply air between 20–100 psi. This pressure usually ensures that a cow's teat is completely coated and sealed by the preparation sprayed as well as allowing or providing for the sprayed preparation to penetrate up into the teat canal of the cow. However, in different configurations of the various components, other air pressures may also allow for the sealing or penetration of the teat or teat canal.

The present invention provides many advantages over existing prior art devices, in addition to those already described.

For example, the present invention allows viscous veterinarian preparations to be sprayed effectively. Preferably the present invention is adapted to allow preparations for the viscosity of between 100–150 centre strokes on the ISO VG scale to be sprayed. To date no other systems are known which allow such preparations to be applied as quickly and as efficiently as is allowed with the present invention.

The present invention may also be relatively inexpensive to produce using modified air spraying devices. This substantially reduces the resulting cost of manufacture for the invention.

The present invention also allows a veterinarian product spray device to be implemented at a relatively low cost which will minimise the amount of product that is used or that runs off a cow's teats in use and which is easy to clean.

The invention may also be specifically adapted to be used with substantially corrosive materials. The present invention may be adapted, by using appropriate materials as described previously, to allow these materials to be sprayed without damaging the spray device itself.

BRIEF DESCRIPTION OF DRAWINGS

Further aspects of the present invention will become apparent from the following description that is given by way of example only and with reference to the accompanying drawings in which.

BEST MODES FOR CARRYING OUT THE INVENTION

Figure 1:
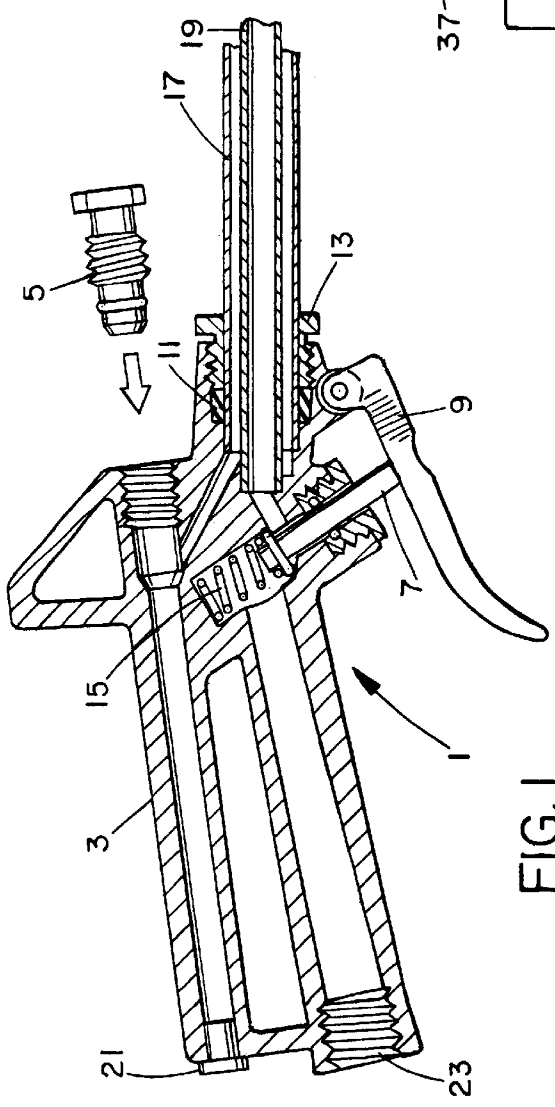
FIG. 1 a sectional view of part of an air spray device according to one aspect of the present invention.

Referring to FIG. 1 the body portion generally indicated by the arrow 1 of an air spray device according to one aspect of the present invention being of conventional structure and comprising body and handle 3, mixture flow controller 5, compressed air flow controller 7, on/off trigger 9, seal 11, gland nut 13, trigger return spring 15, mixture delivery line represented by stainless tube 17 and air delivery line represented by stainless steel tube 19. Also shown are points of attachment for the source of mixture represented by threaded portion 21, and point of attachment of source of compressed air represented by threaded portion 23.

Figure 2:
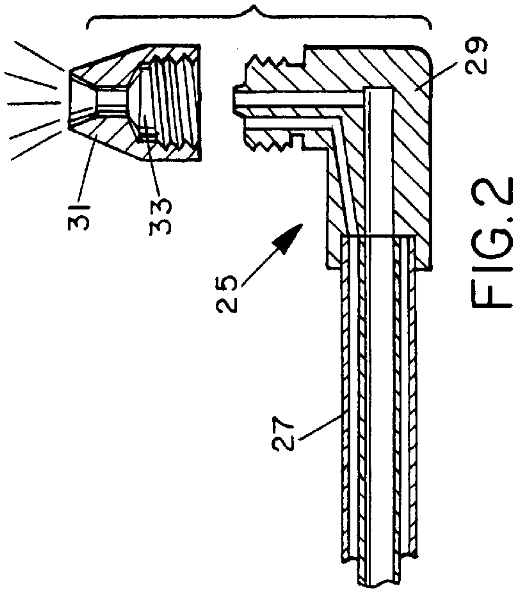
FIG. 2 is a sectional view of a nozzle end of an air spray device according to one aspect of the present invention.

Referring to FIG. 2 there is illustrated the head portion of a spray device being one embodiment of the present invention, generally represented by the arrow 25. It can be seen that at the end of the lance portion 27 there is supported a nozzle head 29 supporting the nozzle 31 at a substantially 90° angle in relation to the axis of the lance 27. Below the nozzle 31 the mixing chamber 33 is shown, into which mixture carried by stainless steel tube 17 and air delivered by stainless steel tube 19 is delivered.

In use, the sources of mixture and compressed air are screwed into threads 21 and 23. Trigger 9 is then depressed permitting compressed air, at a rate controlled by airflow controller 7, to enter into stainless steel tube 19. Compressed air forces its way down stainless steel tube 19 and exits same into mixing chamber 33, the force of which sucks mixture out of stainless steel tube 17 and carries and/or atomises same. From the mixing chamber 33 the carried and/or atomised mixture is further carried by the air out of the nozzle 31 and applied on the intended site of application (not shown).

It will be appreciated the air spray device of the present invention effectively harnesses the venturi effect in utilising compressed air to suck the mixture from the delivery lines 17 of the spray device and carry and/or atomise same, aided by the shape and configuration of the mixing chamber 33 and widened and tapering inner portions of nozzle 31. The mixture is thus uniformly applied to the teats, forming a thin but effective total barrier for same.

Because of the length of the lance 27 and substantially upright orientation of the nozzle 31, the spray device may be easily located in a correct position beneath the udder of a cow, and an UDDERGOLD™ mixture sprayed directly upwards onto each teat. The inventors have indeed found that the design and configuration of the nozzle, and resulting pressure of the spray, has particularly aided prophylactics of mastitis in that the force of the spray forces minute quantities of the UDDERGOLD™ treatment mixture to penetrate through the teat opening into the interior of same effectively sealing the teat from exposure to outside contaminants and exerting treatment effect on the interior of the teat. The teat is thereby completely sealed.

In contrast, after milking a droplet of milk commonly remains on the teat outside the opening for a period of approximately 10–15 minutes. This can prolong the period of time after milking for which the teat hole remains open, and thereby susceptible to the entry of bacteria. Accordingly, when dipping or spraying with other treatment mixtures such as iodine, the iodine is prevented from setting or forming an intact coating for the teat in the proximity of the opening. The contaminants would accordingly be able to enter the opening of the teat. Further, iodine is a relatively weak antiseptic, and is considered to remain effective on the teat for no longer than twenty minutes. These disadvantages are overcome by the spray application of a penetrating sealant barrier with a spray device of the present invention of UDDERGOLD™ treatment preparation.

Figure 3:
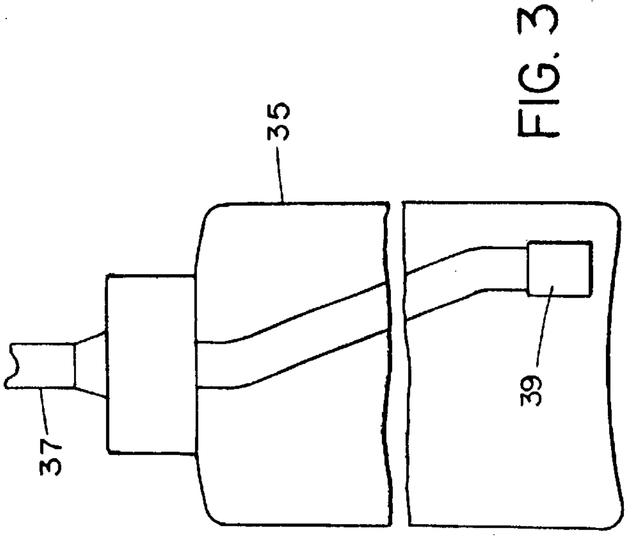
FIG. 3 is a sectional view of a mixture source according to a further aspect of the present invention.

Referring to FIG. 3, there is illustrated a source of mixture for use with a spray device of the present invention, comprising a plastic bottle 35 into which is inserted a tube 37 having a non-return valve 39 at the end of it. The feed tube 37 accordingly leads to and screws into inlet thread 21.

It will be appreciated the spray device of the present invention, not being a product pressurised spray device, can be operated with a minimum of treatment preparation flowing through the delivery lines 17, is easily cleaned, and can be purchased and operated at relatively low cost. Mixture is used far more productively than present application methods permit, and the spraying of UDDERGOLD™ treatments is considered three times more effective than direct application, for example by dipping. Dipping leaves a wastefully thick layer of treatment on the teats.

Figure 4:
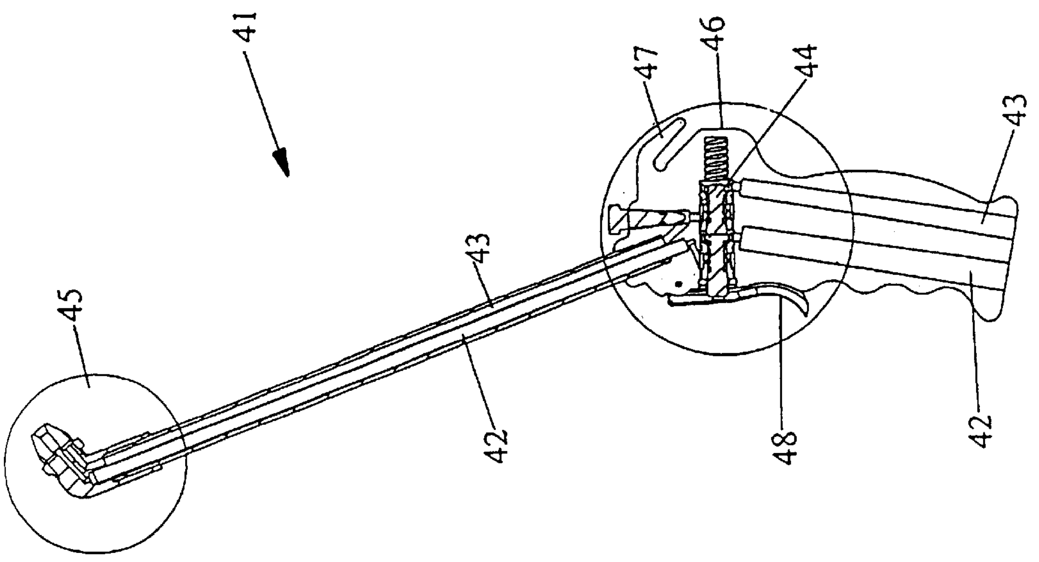
FIG. 4 shows a cross sectional side view of an air spray device configured in accordance with the present invention.

FIG. 4 shows in the air spray device 41 configured in accordance with another embodiment of the present invention.

The air spray device 41 includes air delivery line 42, veterinarian preparation delivery lines 43, a valve assembly 44 and a nozzle 45.

The main body of the device is formed into a handle 46 that includes an aperture 47. The aperture 47 is adapted so that the device 41 may be hung from a hook when not in use.

The air spray device 41 also includes an activating control, shown in this embodiment as a trigger 48. Depression of the trigger towards the handle 46 will activate the valve assembly 44.

Figure 5:
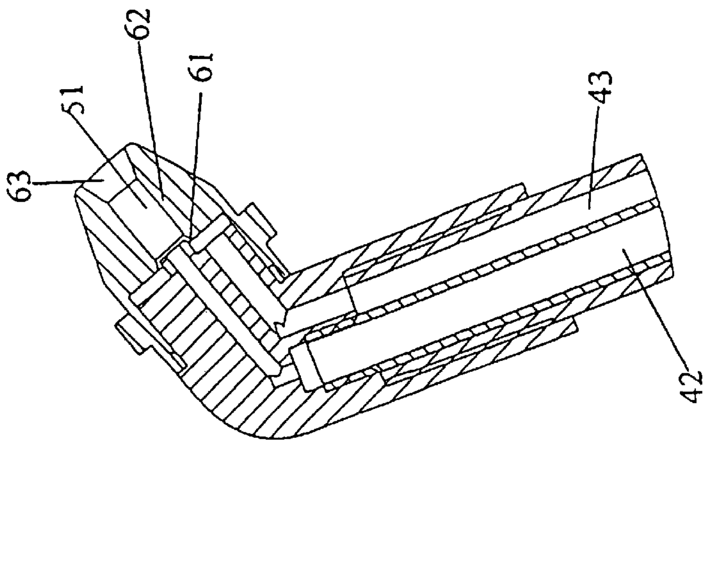
FIGS. 5 and 6 show enlarged views of the circled nozzle and valve assemblies shown in FIG. 4.

FIG. 5 shows an enlarged view of the nozzle 45 shown in FIG. 4.

The nozzle 45 includes an air delivery line 42, a preparation delivery line 43 and a mixing chamber 51. The mixing chamber 51 is adapted so that the point at which air is delivered into the mixing chamber is closer to the end of the nozzle than the point at which the preparation is delivered into the mixing chamber 51.

As can also be seen from FIG. 5 the mixing chamber 51 includes a relatively wide entry point 61, a narrower middle section 62 and another wide exit point 63, allowing same to harness the venturi effect to spray preparation out from the nozzle.

Figure 6:
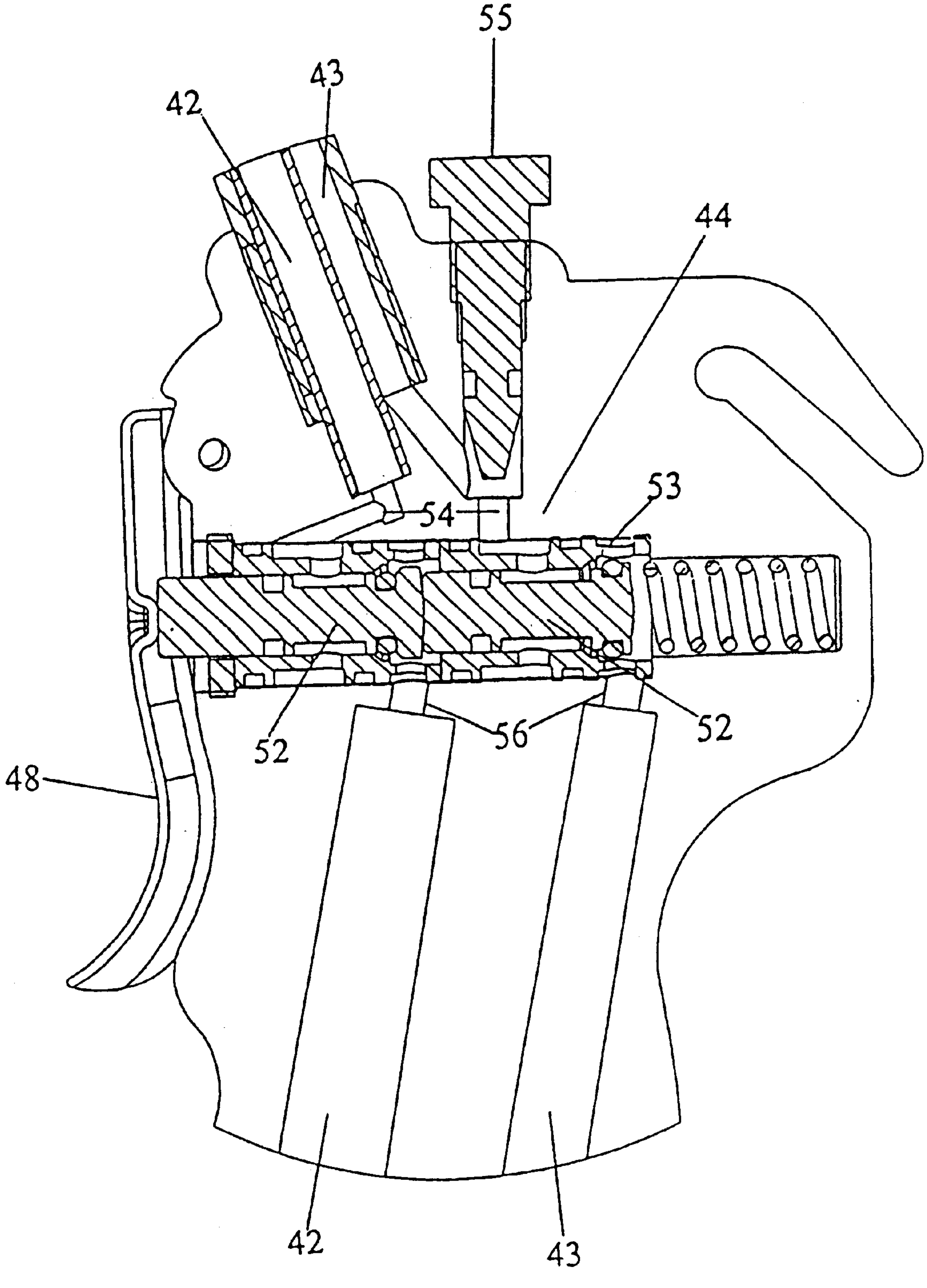

FIG. 6 shows an expanded view of the valve assembly 44 of FIG. 4.

In the embodiment shown the valve assembly 44 controls the amount of both air and preparation supplied to the nozzle 45. The valve assembly includes two valve members 52.

Each of the valve members 52 includes an internal channel (not shown) which may match up valve assembly inlets 56 with outlets 54.

Depression of the trigger 48 will cause both sliding valve members 52 to move down within the valve chamber 53, thereby forming a channel to each of the outlets 54 of the valve assembly. The pressure which is applied to the trigger 48 will therefore determine how far down the valve chamber 53 each of the valve heads 52 travel, and hence the size of the resulting channel through the valve assembly and the amount of air and preparation which may pass through same.

The valve assembly 44 also includes a preparation metering control, shown in this embodiment as a needle valve 55. The main body of the needle valve may be screwed into or out of the valve assembly to control the amount of preparation that may flow through same and into a mixture supply line 43.

The air spray devices shown in FIGS. 1 through 6 have been specifically adapted to spray mixtures or preparations with viscosities of between 100–150 centre strokes on the ISO VG scale.

It is considered a spray device of the present invention and the methods of using same, represent a significant advance over the prior art in terms of the efficient application of preparations, and particularly substantially viscous veterinarian preparations, to a desired substrate.

Aspects of the present invention have been described by way of example only and it should be appreciated that modifications and additions may be made thereto without departing from the scope thereof as defined in the appended claims.

I claim:

1. A method of treating or preventing diseases affecting the teats of a cow, said method comprising the steps of:

attaching a source of a veterinary preparation having a viscosity of between 1–200 center strokes on the ISO VG scale to a mixture delivery line of an air spray device, the air spray device including a mixing chamber, the mixture delivery line for delivering preparation from the source to the mixing chamber, an air delivery line, a control means, and a nozzle adjacent the mixing chamber;

attaching a source of air to the air delivery line to deliver air to the mixing chamber;

controlling the rate of delivery of at least one of the preparation and air to the mixing chamber with the control means;

mixing the preparation and air in the mixing chamber; and spraying the atomized mixture through the nozzle;

wherein the arrangement and configuration of the mixing chamber is such that the venturi effect is harnessed to mix the preparation and air and atomize the mixture prior to spraying same out through the nozzle.

2. A method as claimed in claim 1 wherein the pressure of sprayed preparation allows preparation to penetrate the teat or teat canal of the cow.

3. A method as claimed in claim 1 or 2 wherein the pressure at which the preparation is sprayed from the air spray device is capable of coating the teats of a cow.

4. A method as claimed in claim 1, wherein the preparation has a viscosity of between 100–150 center strokes on the ISO VG scale.

5. A method as claimed in claim 1 wherein air is supplied to the air delivery line at a pressure of between 40–60 psi from an 8–10 cubic foot compressor.

6. The method as claimed in claim 1 or 3, wherein the pressure at which the preparation is sprayed from; the spray device is capable of sealing the teats of a cow.

7. The method as claimed in claim 1, wherein the pressure at which the preparation is sprayed from the spray device and the volume of the preparation sprayed is capable of coating the teats of a cow.

8. The method as claimed in claim 1 or 7, wherein the pressure at which the preparation is sprayed from the spray device and the volume of the preparation sprayed is capable of sealing the teats of a cow.

9. The method as claimed in claim 1, wherein the volume of preparation sprayed is sufficient to coat the teats of a cow.

10. The method as claimed in claim 1 or 9, wherein the volume of preparation sprayed is sufficient to seal the teats of a cow.

* * * * *